United States Patent [19]
Oswald et al.

[11] 3,904,711
[45] Sept. 9, 1975

[54] PREPARING UNSYMMETRICAL DITHIOPHOSPHONIC ACID DIESTERS

[75] Inventors: Alexis A. Oswald, Mountainside; George N. Schmit, Scotch Plains, both of N.J.

[73] Assignee: Exxon Research & Engineering Co., Linden, N.J.

[22] Filed: Aug. 12, 1971

[21] Appl. No.: 171,311

Related U.S. Application Data

[63] Continuation of Ser. No. 823,497, May 9, 1969, abandoned, which is a continuation-in-part of Ser. No. 732,553, May 28, 1968, Pat. No. 3,751,530.

[52] U.S. Cl............... 260/968; 204/158 R; 252/45; 252/46.6; 260/239.95; 260/251 P; 260/283 P; 260/329 P; 260/347.2; 260/609 B; 260/928; 260/948; 260/949; 260/956; 260/957; 260/961; 260/979; 424/200; 424/202; 424/203; 424/204; 424/216; 424/219; 424/217; 424/225; 424/337

[51] Int. Cl........ C07f 9/40; A01n 9/36; C10m 1/48

[58] Field of Search................... 260/948, 968, 979; 204/158 R

[56] References Cited
UNITED STATES PATENTS

| | | | |
|---|---|---|---|
| 3,449,474 | 6/1969 | Griesbaum et al.................. | 260/948 |
| 3,584,127 | 6/1971 | Oswald........................ | 260/948 UX |

FOREIGN PATENTS OR APPLICATIONS

| | | | |
|---|---|---|---|
| 251,742 | 9/1962 | Australia............................ | 260/948 |
| 221,534 | 6/1962 | Australia............................ | 260/948 |

*Primary Examiner*—Anton H. Sutto

[57] ABSTRACT

Dithiophosphonic and dithiophosphinic acid esters can be prepared by free radical addition of the corresponding dithiophosphonic and dithiophosphinic acids to unsaturated compounds, such as olefinic and acetylene compounds, e.g. vinyl chloride, butadiene, allene, methylacetylene, etc.

The unsaturated products of this novel process can be further reacted with a sulfhydryl containing compound such as methanethiol, O,O'-diethyl dithiophosphoric acid to provide SH addition thereto.

Furthermore, both the dithiophosphonate adducts of the free radical addition process and also the dithiophosphonate adducts of the sulfhydryl containing compound addition step can be isomerized to form unsymmetrical dithiophosphonic acid S,S'-diesters.

In addition thereto the unsaturated unsymmetrical dithiophosphonic acid S,S'-diesters can also be further reacted with a sulfhydryl containing compound to provide SH addition thereto.

The novel thiophosphonic and thiophosphinic compounds produced by the above described processes are useful as pesticides, particularly as insecticides, nematocides and lubricating oil additive such as antioxidants, etc.

5 Claims, No Drawings

PREPARING UNSYMMETRICAL DITHIOPHOSPHONIC ACID DIESTERS

The subject application is a continuation of application Ser. No. 823,497, filed May 9, 1969, now abandoned, which in turn is a Continuation-in-Part of application Ser. No. 732,553, filed May 28, 1968 now U.S. 3,751,530.

FIELD OF THE INVENTION

This invention relates to: (1) processes for preparation of dithiophosphonic and dithiophosphinic esters by free radical addition of aliphatic and aromatic dithiophosphonic and dithiophosphinic acids to unsaturates, such as vinyl chloride, butadiene, allene, methylacetylene, etc.; (2) process for adding a sulfhydryl containing compound to unsymmetrical dithiophosphonic acid O,O-diesters; (3) process for isomerizing both the dithiophosphonate adducts of the free radical addition process and also the dithiophosphonate adducts of the sulfhydryl containing compound addition process; (4) process for reacting unsaturated unsymmerical dithiophosphonic acid S,S'-diesters with a sulfhydryl containing compound; (5) the novel mono-adducts formed by the processes of (1), (2), (3) and (4); and (6) methods for using the adducts of (1), (2), (3) and (4) as pesticides and oil additives.

PRIOR ART

Preparation of dithiophosphonic and dithiophosphinic acid esters is well known. Such esters are usually prepared by displacement reactions of the corresponding acid salts or chlorides, as described in Houben-Weyl, Methoden der Organischen Chemie, Volume XII/1, Organische Phosphor-Verbindungen, pages 284–285, 586–590, Ed. E. Mueller, Publ. G. Thieme Verlag, Stuttgart, Germany, 1963.

Recently, however, dithiophosphonates and dithiophosphinates have been prepared by ionic addition. For example, German Pat. Nos. 1,071,701 and 1,102,138 disclose the spontaneous, ionic addition of dithiophosphonic and dithiophosphinic acids to vinylic sulfides.

It has not been heretofore known to prepare dithiophosphonic and dithiophosphinic acid esters by means of free radical addition of the corresponding dithiophosphonic and dithiophosphinic acids to unsaturates, such as olefinic and acetylenic compounds. Moreover, unsaturated dithiophosphonate and dithiophosphinate ester compositions have likewise not been previously known, nor has their unexpected activity as pesticides and oil additives been known as well.

Thiol esters of phosphorus acids represent a biologically active class of organic compounds. Thiophosphonates and dithiophosphonates show an especially high level of biological activity. These compounds were found to be attractive for pest control. Their usefulness, in turn, initiated further work directed towards finding more economical methods for their preparation. Work was also carried out to synthesize new compositions with improved pesticidal properties.

A particularly active, known class of thiophosphonate pesticides can be described by the following general formula:

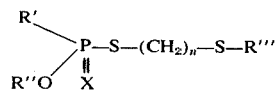

wherein R' and R''' are hydrocarbyl, preferably lower alkyl groups, R'' is a lower alkyl group, X is sulfur and oxygen and $n$ is 1 and 2. The methods developed for the synthesis of these compounds by Gerhard Schrader in Germany used mainly displacement reactions. The various types of these reactions are shown in Table I.

The last reaction listed in Table I is a spontaneous, cationic addition reaction between a dithiophosphonic acid and a vinyl sulfide. The reaction yields the corresponding Markovnikov type adduct, apparently via the following mechanism:

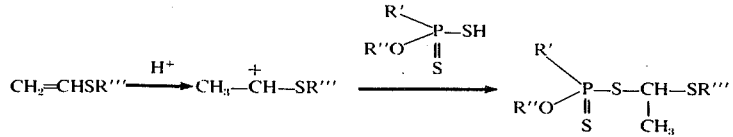

TABLE I

| Type of Reaction | Patent Number |
|---|---|
| $\begin{matrix} R' \\ R''O \end{matrix} \!\!>\!\! P{-}Cl + HS(CH_2)_nSR''' \longrightarrow$ | German 1,032,247 |
| ↓ $\begin{matrix} R' \\ R''O \end{matrix} \!\!>\!\! P{-}S(CH_2)_nSR'''$ | |
| $\begin{matrix} R' \\ R''O \end{matrix} \!\!>\!\! P{-}SNa + Cl(CH_2)_nSR''' \longrightarrow$ | German 1,132,132 |
| $\begin{matrix} R' \\ R''O \end{matrix} \!\!>\!\! P{-}Cl + HS(CH_2)_nSR''' \longrightarrow \begin{matrix} R' \\ R''O \end{matrix} \!\!>\!\! P{-}S(CH_2)_nSR'''$ | German 1,109,680<br>German 1,072,245 |
| $\begin{matrix} R' \\ R''O \end{matrix} \!\!>\!\! P{-}SH + CH_2O + HSR''' \longrightarrow \begin{matrix} R' \\ R''O \end{matrix} \!\!>\!\! P{-}SCH_2SR'''$ | Belgian 592,344 |
| $\begin{matrix} R' \\ R''O \end{matrix} \!\!>\!\! P{-}SH + CH_2{=}CHSR''' \longrightarrow \begin{matrix} R' \\ R''O \end{matrix} \!\!>\!\! P{-}SCHSR'''\ CH_3$ | German 1,071,701 |

S-Vinyl dithiophosphonates do not react with thiols under similar conditions. It was surprisingly found in the present invention that thiols can be added to vinyl dithiophosphonates under free radical conditions to yield the corresponding anti-Markovnikov type adduct via the following radical mechanism:

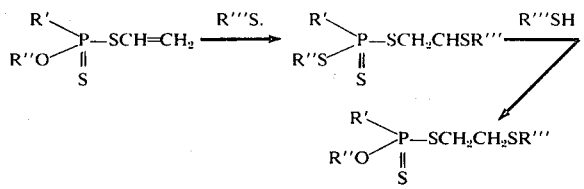

In the above case, the anti-Markovnikov adducts are identical with the known S-(2-hydrocarbylthio)-ethyl dithiophosphonate pesticides. Previously these pesticides could be made only by displacement reaction.

The new free radical reaction could be readily extended to substituted vinylic dithiophosphonates. The corresponding vinylic monothiophosphonates can be also used as reactants:

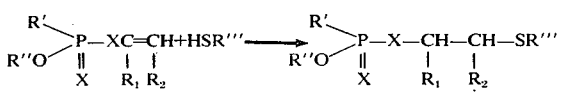

wherein $R_1$ and $R_2$ are hydrogen, chlorine, cyano, $C_1$ to $C_8$ hydrocarbyl, $C_1$ to $C_8$ monosubstituted hydrocarbyl, preferably hydrogen, $C_1$ to $C_3$ alkyl, most preferably, $R_1$ is hydrogen, $R_2$ is hydrogen methyl, X is sulfur, oxygen provided at least one X is sulfur.

Several organic monothio and dithiophosphonate esters of the thiono type represented by the general formula

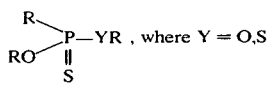

are well known as pesticides. Symmetrically substituted dithiophosphonate esters of the thiol type are also known from the reaction of the corresponding phosphonic acid dichlorides with thiolates, e.g.

[see Anisimov and others, Izv. Akad. Nauk SSSR 823 (1955)] No unsymmetrically S-disubstituted dithiophosphonates are known, however, to our knowledge.

In the present invention, it was found that the unsymmetrically S-disubstituted dithiophosphonates can be produced by novel methods.

SUMMARY OF THE INVENTION

In accordance with the present invention, therefore, a thiol acid of phosphorus having the general formula

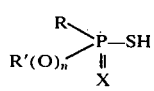

where R and R' are each the same or different $C_1$-$C_{30}$ monovalent hydrocarbyl radical or substituted derivative thereof, preferably a $C_1$-$C_6$ hydrocarbyl or $C_1$-$C_6$ monosubstituted hydrocarbyl radical, most preferably phenyl, monosubstituted phenyl, $C_1$-$C_5$ alkyl, $C_1$-$C_5$ monosubstituted alkyl and n is 0 or 1, is reacted in a free radical process with an unsaturated compound containing one or more olefinic and/or acetylenic bonds to produce the corresponding adducts. The reactive unsaturation can be in a terminal or an internal position, and the internal unsaturation can occur in an open chain or be part of a cyclic system. Examples of suitable dithiophosphonic and dithiophosphinic acid reactants are:

O-ethyl methanedithiophosphonic acid, O-isopropyl methanedithiophosphonic acid, O-cyclohexyl methanedithiophosphonic acid, O-ethyl 4-methoxybenzenedithiophosphonic acid, O-dodecyl 2-naphthalenedithiophosphonic acid, O-ethyl 4-chlorobenzenedithiophosphonic acid, O-methyl chloromethanedithiophosphonic acid, phenyl benzenedithiophosphonic acid, diethyl dithiophosphinic acid, dibutyldithiophosphinic acid, dicyclohexyl dithiophosphinic acid, dibenzyl dithiophosphinic acid, diphenyl dithiophosphinic acid, methylphenyl dithiophosphinic acid, bis(chlorophenyl) dithiophosphinic acid, trimethylene dithiophosphinic acid.

Any olefinic or acetylenic compound can serve as a free radical reactant for the above acids if it does not contain groups which enter into other reactions under the reaction conditions employed. Because of the interfering salt forming reaction, for example, free unsaturated bases are not suitable reactants for the present free radical additions.

Although any olefinic and/or acetylenic compound can be used, with the above limitations, they are usually selected from compounds of the general formulae

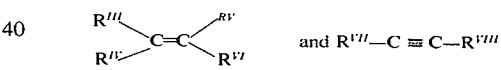

where $R^{III}$ to $R^{VIII}$ inclusive are hydrogen, cyano; fluorine, chlorine, bromine; and a $C_1$-$C_{28}$ organic radical such as carboalkoxy, acyl, etc. More preferably, the $C_1$-$C_{28}$ organic radical is a $C_1$-$C_{28}$ monosubstituted hydrocarbyl radical such as chloromethyl, hydroxyethyl, carboalkoxymethyl, chlorobenzyl, methylthiophenyl, chlorooctadecyl, chlorovinyl, etc.; most preferably it is a $C_1$-$C_{28}$ hydrocarbyl radical such as methyl, dodecyl, t-butyl, propynyl, phenyl, octadecylphenyl, vinyl, benzyl, etc. It is preferable that the unsaturated compound have at least one hydrogen substituent. In the case of the olefinic reactant it is preferable that it have two hydrogen substituents. In the case of the acetylenic reactant, which itself is a preferred reactant, it is preferable that it be only mono-substituted. It is most preferable, however, that the unsaturated reactants have only one non-hydrocarbon organic group substituent.

The novel free radical additions of this invention to mono-olefinic or isolated di-and poly-olefinic unsaturation lead to the corresponding anti-Markovnikov type adducts. For example, in the case of a compound containing an isolated, terminal olefinic group, the following reaction takes place.

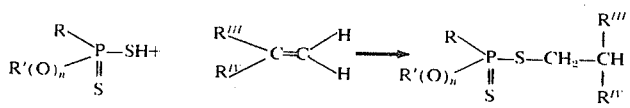

In contrast to the known ionic additions of dithiophosphonic acids, the present radical additions produce the less branched adduct isomer.

In another characteristic case, an n-$\alpha$, $\Omega$-diolefin reacts in a free radical manner yielding both the mono- and diadducts.

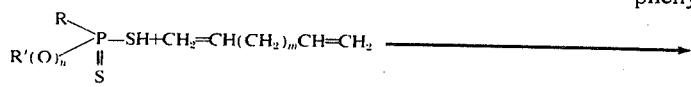

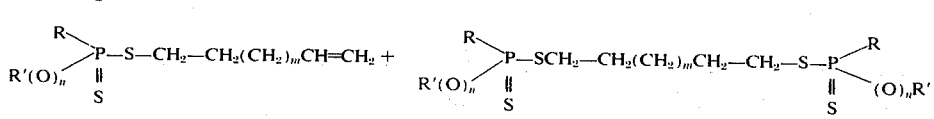

Mono-adduct   Di-adduct   wherein $m$ is 1 to 24. As illustrated by the present reaction scheme in one embodiment of this invention the diolefins and polyolefins containing isolated double bonds react at one or more sites of unsaturation to yield the corresponding phosphorus esters attached at the olefinic carbon atom having more hydrogen atoms, in accordance with the anti-Markovnikov principle.

In contrast to diolefins having isolated double bonds, conjugated diolefins in another embodiment of this invention were found to react to yield primarily the monoadducts.

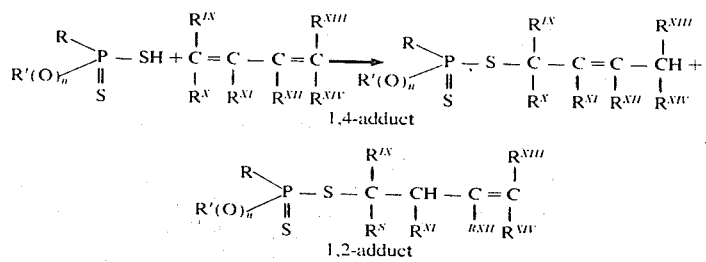

where $R^{IX}$-$R^{XIV}$ inclusive can be hydrogen; halogen, preferably chlorine or fluorine; cyano; $C_1$-$C_4$ alkyl, preferably methyl; and phenyl or mono-substituted phenyl, such as chlorophenyl, nitrophenyl, etc. It is preferred to have at least 4 hydrogen substituents on the conjugated carbon skeleton. The nonhydrocarbon substituents are preferably on the inner carbon atoms of the starting conjugated diene.

Some of the preferred conjugated dienes of the above type are: butadiene, isoprene, chloroprene, cyanoprene, 2,3-dimethyl butadiene, piperylene, and 1-phenylbutadiene, etc.

Cyclic conjugated dienes, such as 1,3-cyclopentadiene, 1,3-cyclohexadiene, 1,3-cyclooctadiene, 1,3-cyclododecadiene, etc. similarly undergo 1,4- and/or 1,2-mono addition.

The parent conjugated diene, butadiene, and internally substituted dienes such as isoprene yield mainly the thermodynamically more stable 1,4-monoadduct:

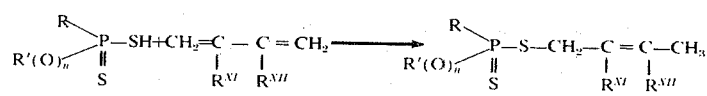

Terminally substituted dienes such as piperylene yield major quantities of both the 1,2- and the 1,4-monoadducts. Diaddition to conjugated dienes in general takes place much slower than monoaddition because the monoadduct intermediates have less reactive internal unsaturation.

In still another embodiment of this invention, cumulative dienes yield the corresponding mono- and diadducts. It is believed that their respective formation is by a concurrent terminal and center attack mechanism as presented in the following equations:

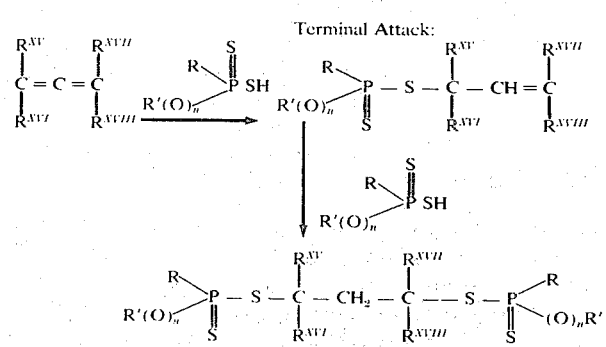

-Continued

Center Attack:

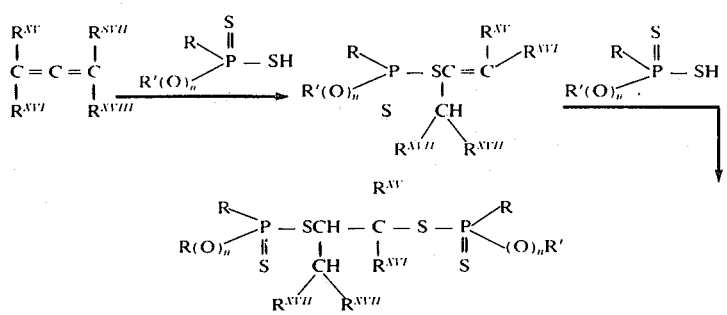

where $R^{XV}$-$R^{XVIII}$ can be hydrogen, halogen, cyano, $C_1$-$C_{12}$ hydrocarbyl preferably alkyl, most preferably methyl, $C_1$-$C_6$ substituted hydrocarbyl.

The cyclic cumulative dienes react in a similar manner.

In a preferred embodiment the parent cumulative allene reacts to yield mainly terminaly mono-adduct.

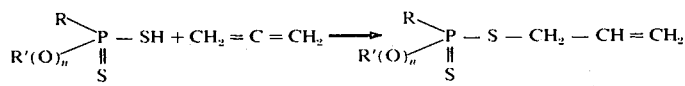

In yet another embodiment of this invention, dithiophosphonic or dithiophosphinic acids react with acetylenes to yield the corresponding mono- and diadducts as shown in the following equations.

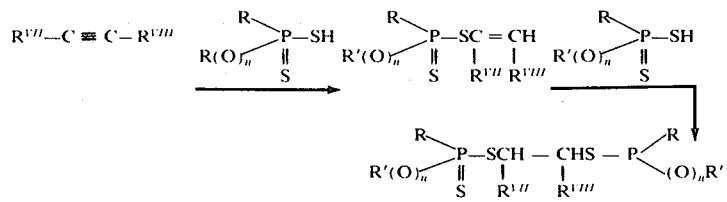

where $R^{VII}$ and $R^{VIII}$ are the same as before. The acetylenic unsaturation can be part of a cyclic system.

Unsymmetrical acetylenes react in an anti-Markovnikov manner to yield mainly the corresponding vinylic mono-adducts.

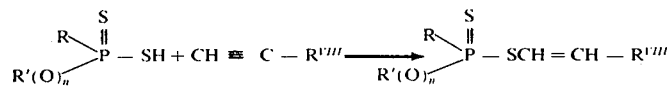

Among the preferred monosubstituted acetylenic reactants are alkylacetylenes having preferably a $C_1$-$C_4$ alkyl substituent and arylacetylenes. The most preferred acetylenic reactants are methylacetylene; phenylacetylene and its monosubsituted derivatives such as chlorophenylacetylene; monosubsituted $C_1$-$C_6$ alkylacetylene derivatives such as propargyl alcohol, propargyl chloride, propargyl methyl sulfide, and acetylenic carboxylic esters such as ethyl propiolate, etc.

The foregoing free radical additions can be effected in the presence or in the absence of initiators. However, the use of one or more free radical initiator is usually preferred. Exemplary of such initiators are chemical initiators such as e.g., peroxides, such as t-butyl peroxide and azo compounds such as azobisisobutyronitrile and/or radiation, for example, light, gamma-irradiation, heat, etc. The amount of chemical initiators ranges from 0.001 to 10 mole percent, preferably from 0.1 to 3 mole percent.

Temperatures employed in these free radical reactions generally range from about −100°C. to about 200°C., preferably from about −30°C. to about 150°C. In the case of chemical initiators, the preferred reaction temperatures would be of course dependent upon the thermal stability of the initiators. Reaction temperatures are used at which the initiator is decomposed at a reasonable rate to generate a desirable concentration of free radicals. If ultra-violet and gamma irradiation are used to initiate the reaction, ambient or low temperatures are preferable. A simultaneous initiation by chemical initiators and radiation can be of advantage. Sometimes the reaction temperauture can be limited by the thermal stability of the reactants; it can also be limited in order to avoid undesirable ionic side reactions.

The minimum pressure of the free radical reactions is that which keeps the reaction mixture in the liquid phase. In the case of some gaseous unsaturated reactants such as ethylene and acetylene, e.g., superatmospheric pressures may be necessary. Subatmospheric, e.g., 0.5 atmospheres as well as superatmospheric pressures, e.g., 100 atmospheres can be used.

The molar ratio of acid to unsaturate is not critical. About 0.1 to about 10 moles of acid can be employed per mole of unsaturation. The preferred molar ratio is 0.1 to 3 moles of acid per mole of unsaturate. In the case of acetylene and dienes, an excess of the unsaturate can be used to favor the formation of the corresponding mono-adduct.

In general, the free radical additions are carried out in the absence of solvents to yield liquid products. Solvents can be employed, however, and can be of advantage for the dissolution of gaseous reactants and of solid products. Useful solvents are those that are inert to the reactants and do not inhibit the free radical initiation and propagation processes which lead to the formation of the desired adducts. Exemplary of such useful solvents are aliphatic and aromatic hydrocarbons as well as ethers and thio-ethers.

The reaction is normally carried out for a period of time sufficient to form a substantial amount of the free radical adduct, e.g., 10 minutes to about 300 hours preferably 1 to 24 hours. The unreacted acid is preferably removed as its water soluble sodium or ammonium salt. The unreacted unsaturate is then removed, preferably by distillation. Purification of the crude adducts can be accomplished by fractional distillation, preferably in vacuo.

While some of the dithiophosphonates and dithiophosphinates are known compounds and can be prepared by the presently claimed process as well as by other known processes, several types of novel compounds as well can be prepared by the present process. The present process is uniquely suited for the preparation of such new compounds.

The novel dithiophosphonic and dithiophosphinic acid ester monoadducts resulting from addition to the halogenated monoolefins are defined by the following formula:

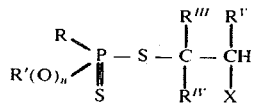

R, R', and R''' to R$^V$ are as before; X is F, Cl, or Br; and n is 0 or 1. Preferred adducts include those of the formula (where R, R', R$^V$ and X are as before):

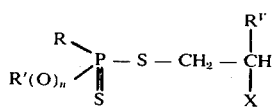

Most preferred compounds include those of the following formula (where R, R', and X are as before):

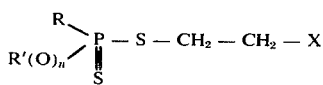

The following are typical of the preferred compounds:

S-chloroethyl O-ethyl ethanedithiophosphonate, S-bromoethyl O-methyl chloromethanedithiophosphonate, S-fluoroethyl diphenyl dithiophosphinate, S-cyanochloroethyl O-propyl methanedithiophosphonate, chloropropyl O-ethyl benzenedithiophosphonate, and dichloropropyl O-methyl cyclohexanedithiophosphonate, etc.

As previously indicated the present dithiophosphonic and dithiophosphinic acid-conjugated diene monoadducts of this invention have the following general formulae:

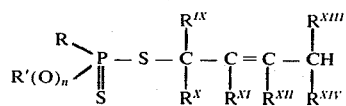

and

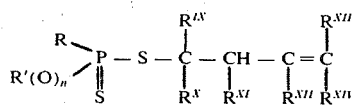

wherein each of the various R groups is as previously described. Also indicated previously as preferred compounds are included the above general type adducts of butadiene and its internally substituted derivatives such as those of the formula

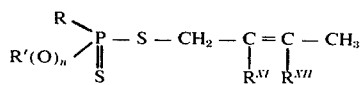

Some examples of the present conjugated diene adducts are as follows: S-crotyl dichlorophenyl ldithiophosphinate, S-crotyl dimethyldithiophosphinate, S-crotyl O-methyl ethanedithiophosphonate, S-1-(2-chlorobuten-2-yl)-O-ethyl methanedithiophosphonate, S-1-(2,3-dimethylbuten-2-yl)-O-amyl benzenedithiophosphonate, S-2-n-pentenyl O-methyl chlorobenzenedithiophosphonate, S-3-pentenyl O-cyclohexyl chloromethanedithiophosphonate, S-2-(2,5-dimethylhexen-3-yl)-O-ethyl hydroxyethane dithiophosphonate, S-2-(cyanobuten-2-yl)-O-ethyl isopropanedithiophosphonate, S-2-(methylbuten-2-yl)-O-chlorophenyl benzenedithiophosphonate, S-2-(fluorobuten-2-yl)-O-fluoroethyl cyclohexanedithiophosphonate.

Novel cumulative diene adducts of this invention are as follows:

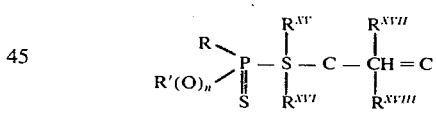

and

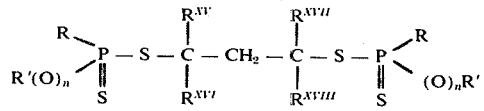

wherein the meaning of symbols is the same as described earlier.

A most preferred new composition of matter is the terminal adduct of allene represented by the following formula

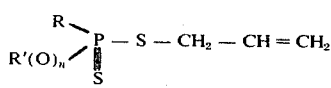

Examples of the claimed new cumulative diene adduct compositions are listed in the following: S-allyl O-ethyl methanedithiophosphonate, S-allyl O-dodecyl chlorobenzenedithiophosphonate, S-allyl O-methyl cyclohexanedithiophosphonate, S-allyl dimethyl phenyldithiophosphinate, S, S'-trimethylene bis-(O-ethyl methanedithiophosphonate).

The last embodiment relating to new compositions concerns adducts of acetylenic compounds with the following general formulae:

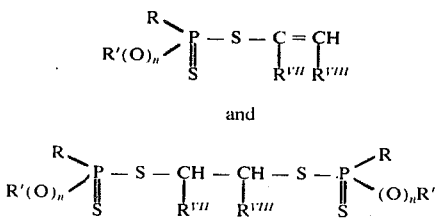

wherein the meaning of R's is again the same.

A particularly claimed species within this general type is the monoadduct of a monosubstituted acetylene or of acetylene itself, with the following general formula:

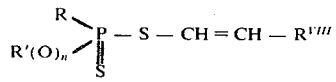

Exemplary of the present vinylic dithiophosphonates and dithiophosphinates and alkylene bis dithiophosphonates and bis dithiophosphinates are as follows:

Vinyl O-ethyl methanedithiophosphonate, vinyl O-dodecyl benzenedithiophosphonate, vinyl dichlorophenyldithiophosphinate, propenyl O-ethyl methanedithiophosphonate, propenyl O-methyl benzenedithiophosphonate, hexenyl O-hexadecyl methanedithiophosphonate, phenylethenyl O-ethyl methanedithiophosphonate, hydroxypropenyl O-chloroethyl cyclohexane dithiophosphonate, chloropropenyl O-ethyl methanedithiophosphonate ethylene bis-(O-ethyl methanedithiophosphonate), 1,2-propylene bis-diphenyldithiphosphinate, 2-buten-2-yl O-methyl methanedithiophosphonate 2-carbomethoxyethenyl O-methyl ethanedithiophosphonate.

In another embodiment of the subject reaction, a thiol compound is added to an unsaturated thiophosphonate or an unsaturated sulfide to produce novel pesticidal compositions

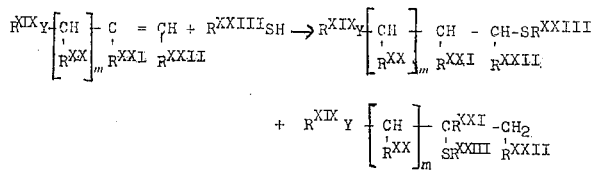

wherein $m$ is 0 to 1, $R^{XX}$-$R^{XXII}$ are hydrogen, chlorine, cyano, $C_1$-$C_8$ hydrocarbyl, $C_1$-$C_8$ monosubstituted hydeocarbyl, preferably hydrogen, $C_1$-$C_3$ alkyl, most preferably $R^{XX}$ and $R^{XXI}$ are hydrogen, $R^{XXII}$ is hydrogen methyl, Y is oxygen, sulfur.

The thiol compound $R^{XXIII}SH$ used in the present invention is a $C_1$-$C_6$ aliphatic thiol, a $C_6$-$C_8$ benzenethiol, a $C_6$-$C_8$ non-hydrocarbon substituted benzenethiol, a $C_2$-$C_{10}$ heterocyclic thiol, a $C_1$-$C_3$ aliphatic thiolcarboxylic acid, unsubstituted or monosubstituted thiolbenzoic acid, a $C_1$-$C_{10}$ O-alkyl dithiophosphonic acid, a $C_1$-$C_{10}$ O-alkyl monothiophosphonic acid, a $C_1$-$C_8$ dialkyl dithiophosphoric acid, a $C_1$-$C_8$ dialkyl monothiophosphoric acid, a $C_1$-$C_{10}$ dihydrocarbyl dithiophosphinic acid.

Examples of suitable thiol reactants are methanethiol, n-propanethiol, sec.-propanethiol, t-butanethiol, n-hexanethiol, benzenethiol, 4-methylthiobenzenethiol, 4-chlorobenzenethiol, 3,4-dichlorobenzenethiol, 3-methyl-4-nitrobenzenethiol, pentafluorobenzenethiol, mercaptothiazole, mercaptobenzothiazole, furfuryl mercaptan, mercaptomethyl thiophene, 8-quinolinethiol, pyridinethiol, thiolacetic acid, thiolproionic acid, thiotoluic acid, O-methyl methanedithiophosphonic acid, O-n-propyl ethanedithiophosphonic acid, O-ethyl benzenedithiophosphonic acid, O-i-propyl methyl thiomethanedithiophosphonic acid, O-ethyl i-propyloxymethanedithiophosphonic acid, o-ethyl 4-chlorobenzenedithiophosphonic acid, O-ethyl 1-propynedithiophosphonic acid, O-ethyl 4-methyl thiobenzenedithiophosphonic acid, O-ethyl methanethiophosphonic acid, O-i-butyl ethanethiophosphonic acid, O-ethyl ethanethiophosphonic acid, O-methyl 2-propanethiophosphonic acid, O-ethyl 3-chloropropanethiophosphonic acid, O-methyl 2-methylthioethanethiophosphonic acid, O,O'-diethyl dithiophosphoric acid, O-ethyl O'-n-propyl dithiophosphoric acid, O,O-di-i-butyl dithiophosphoric acid, O,O'-dimethyl thiophosphoric acid, O,O,-di-i-propyl thiophosphoric acid, dimethyl dithiophosphinic acid, ethyl phenyl dithiophosphinic acid, and di-i-propyl dithiophosphinic acid.

The unsaturated thiophosphonate and sulfide reactants of the present invention

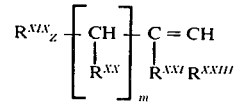

have an $R^{XIX}$ group which is a $C_1$-$C_{10}$ organic radical and phosphonyl.

The phosphonyl group has the general formula

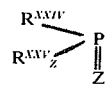

wherein $R^{XXIV}$ is a $C_1$-$C_8$ saturated aliphatic and aromatic organic radical which can contain halogen, sulfur and oxygen besides carbon and hydrogen, $R^{XXV}$ is a $C_1$-$C_6$ alkyl radical and Z is sulfur, oxygen.

When $R^{XIX}$ is a hydrocarbyl group, Z is sulfur. In case $R^{XIX}$ is a phosphonyl group, Z is sulfur and oxygen.

In accordance with the above definition, examples of the unsaturated sulfide and thiophosphonate reactants are allyl methyl sulfide, crotyl methyl sulfide, 2-methallyl-n-propyl sulfide, crotyl ethyl sulfide, chlorocrotyl phenyl sulfide, 2,3-dimethylcrotyl chlorophenyl sulfide, 2-cyanoallyl methyl sulfide, allyl 3-methyl-4-methylthiophenyl sulfide, allyl pentafluorophenyl sulfide, allyl mercaptobenzothiazyl sulfide, allyl 8-quinolyl sulfide, allyl acetyl sulfide, S-allyl O-ethyl methanedithiophosphonate, S-crotyl O-methyl chloroethanedithiophosphonate, S-allyl O-propyl ethanedithiophosphonate, S-chlorocrotyl O-ethyl methanethiophosphonate, S-allyl O-i-butyl benzenedithiophosphonate, S-allyl O-ethyl benzenedithiophosphonate.

Some of the products produced by the claimed additions are:

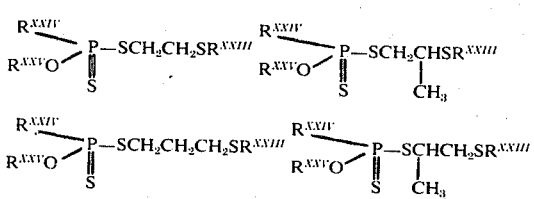

wherein $R^{XXIII}$, $R^{XXIV}$, and $R^{XXV}$ are as defined earlier. Examples of the new products produced by the claimed process are S-2methylthiopropyl O-ethyl ethanedithiophosphonate, S-2-ethylthiopropyl O-ethyl ethylthiomethanedithiophosphonate, S-2-phenylthiobutyl O-n-propyl 2-methylthioethanedithiophosphonate, S-2-methylthiopropyl O-ethyl benzenedithiophosphonate, S-3-methylthiopropyl O-ethyl methyoxymethanethiophosphonate, S-3-(2-benzothiazolythio) propyl O-i-butyl ethanedithiophosphonate, S-3-α-thienylthiopropyl O-ethyl methanethiophosphonate S-i-(1-methylthio)-propyl O-propyl ethanedithiophosphonate, S-i-[1-(4-methylthio) phenylthio] propyl O-ethyl i-propyloxymethanedithiophosphonate, S-2-(3,4-dichlorophenylthio) propyl O-ethyl 3-chloropropanedithiophosphonate.

More particularly, another more specific part of our invention is schematically shown by the following reaction scheme:

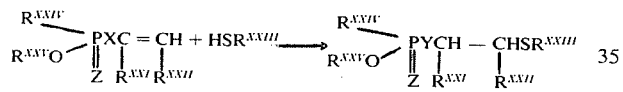

wherein $R^{XXI}$ $R^{XXIII}$ are as defined previously, $R^{XXIV}$ is a $C_1$-$C_8$ saturated aliphatic and aromatic organic radical, and $R^{XXVI}$ is a lower alkyl, preferably $C_1$-$C_4$ alkyl group.

One of the most preferred subclass of reactants, often used in the examples of the present work, is that of S-propenyl, dithiophosphonates.

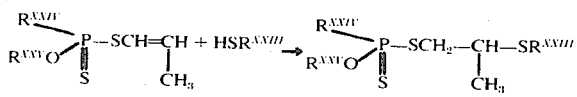

The use of propenyl thiophosphonates and other substituted vinylic thiophosphonates, as reactants in our invention, results in so-called branched thiophosphonates, compounds which have for $R^{XXI}$ and/or $R^{XXII}$ groups other than hydrogen atoms.

Instead of the vinylic thiophosphonate reactants, allylic thiophosphonate and sulfide reactants may also be used in the process of the present invention. The allylic thiophosphonate reactants can be reacted with thiols by an ionic or free radical reaction mechanism to yield the following new compositions:

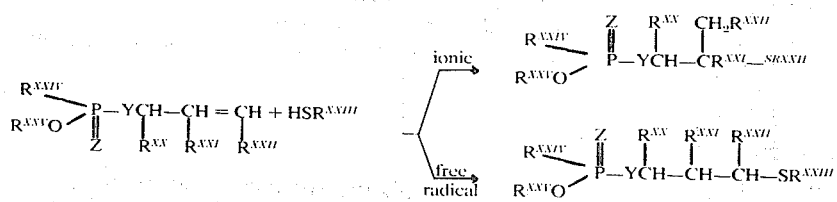

wherein $R^{XX}$-$R^{XXV}$ are as defined previously. The products of the ionic reaction mechanism can also be derived from vinylic thiophosphonates.

Radical and ionic reactions of allylic sulfides with thiophosphonic acids result in the following new compositions:

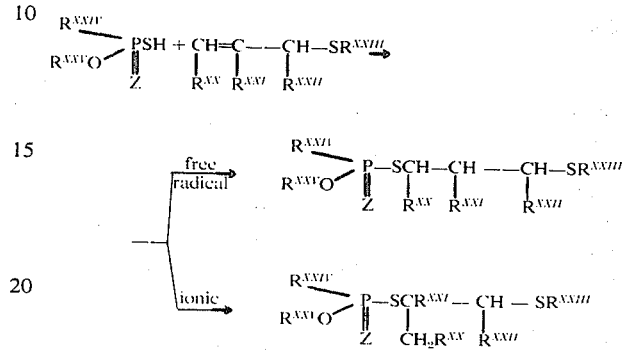

One of the most preferred subclass of reactants, used in the examples of the present memorandum, is that of allyl hydrocarbyl sulfides.

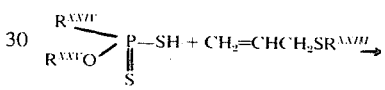

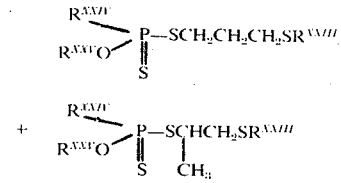

The claimed thiol additions can be effected in the liquid phase from −150°C. to +150°C. preferably from 0° to +130°C. The pressure is usually atmospheric. However, superatmospheric pressures may be used with advantage to keep volatile reactants in the liquid reaction phase. The ratio of the thiol to olefin reactant may vary from 0.5:1 to 10:1, preferably 1:1 to 5:1. The reactions may be carried out in the presence or in the absence of added reaction catalysts, initiators and inhibitors. The amount of added reaction catalyst, initiator and inhibitor may vary from 20 to 0.01 percent, preferably 10 to 0.1 percent, most preferably 0.2 to 5 percent. The reaction is usually carried out in the absence of any solvent. However, solvents may be used to advantage in the case of solid and gaseous reactants. Solvent may also be preferred to control the reaction temperatures. Suitable solvents include aliphatic alcohols such as methanol, ethers and thioethers such as dimethyl sulfide, hydrocarbons such as toluene, cyclohexane, carboxylic acids such as acetic acid, ketones such as acetone. The solvents are selected in such a manner as to avoid side reactions, e.g., between the solvent and the reactants.

To initiate the free radical additions to S-vinylic thiophosphonates and S-allyl sulfides, a free radical type initiator is used. Such an initiator is radiation and/or a chemical initiator. Examples of radiation initiation are ultra-violet light, gamma rays, heat. Chemical free radical initiators include azo compounds such as azo-bis-isobutyronitrile, peroxides such as di-t-butyl peroxide, benzoyl peroxide, t-butyl hydroperoxide.

To accelerate the ionic additions to S-allyl thiophosphonates and sulfides cationic catalysts are used. Such catalysts include Lewis acids such as boron trifluoride, perchloric acid, methanesulfonic acid, polyphosphoric acid, sulfuric acid. Thiophosphonic acids and thiols are themselves acidic and as such can be cationically added to said S-allyl compounds without any added catalysts. However, especially in the case of thiol adding agents heat is necessary to achieve a practical rate of conversion. Raising the temperature increases the rate of the ionic addition. However, heat also initiates the free radical addition. To avoid a concurrent free radical addition, inhibitors may be used. Applicable radical inhibitors include sulfur, dialkyl polysulfides, hindered phenols, hydroquinones.

In general, the rate of the free radical reactions, once initiated, is less influenced by the temperature of the reaction. To carry out said additions in a clean free radical manner, ultra-violet or gamma ray radiation initiated reactions are among the preferred. Low temperature chemical initiators can be also used to the same end.

The additions are generally run to achieve a substantial, i.e., greater than 40 percent conversion of the unsaturated reactant. The reaction time necessary is dependent on the initiator and the catalyst used. In the case of chemical free radical initiators, such a reaction temperature is selected so that the half life of the initiator will be several hours. Similarly, the proper intensity of the radiation intensity is selected. The temperature and time of ionic reactions may be controlled by the gradual addition of one of the reactants.

After the addition is discontinued, low molecular weight thiol reactants can be purged. Thiophosphonic acids can be removed by converting them into their water soluble salts, e.g., with 5 percent aqueous sodium hydrogen carbonate solution. The neutral crude product can be usually purified by fractional distillation in vacuo.

The resulting adducts were found to be surprisingly useful as pesticides. Particularly those adducts are useful in this respect which have molecular weights below 500. This molecular weight limitation is especially important with regard to the systemic pesticidal action of the adducts. For a systemic action the adduct should have less than 300 molecular weight.

Some of the new insecticides of the present invention i.e., when m=0 have branching on the aliphatic chain between the thiophosphonate and the alkyl sulfide or second thiophosphorus group. In terms of the general formula of the isomeric products of our process

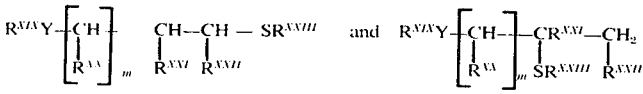

this means certain structural limitations for the new compositions claimed. In the case of the first isomer, when $m$ is 0, $R^{XXI}$ or $R^{XXII}$ must be a group other than hydrogen. For systemic pesticides, only one of the sulfur bonded groups, i.e., either $R^{XIX}$ or $R^{XXIII}$ should be a thiophosphorus group. Also for systemic pesticidal action it is preferable that the new compositions should not contain an aromatic group or chlorine. Finally, from the viewpoint of chemical especially of hydrolytic stability it is preferable that $R^{XXI}$ should be hydrogen. To keep the molecular weight down, the maximum carbon number of any alkyl group is 4 preferably $C_1$ or $C_2$. To have a hydrolytically stable compound it is preferred that the O-alkyl group of the thiophosphorus moiety, i.e., $R^{XXV}$ should be ethyl rather than methyl. For maximum systemic action, however, all the other groups should be kept to a minimum, i.e., methyl or hydrogen. In the case of the second isomeric composition, for example, $R^{XXII}$ is most preferably hydrogen.

In the case of hydrocarbon thiophosphonic acid adduct derivatives some of the preferred new compositions for pesticidal use are the following:

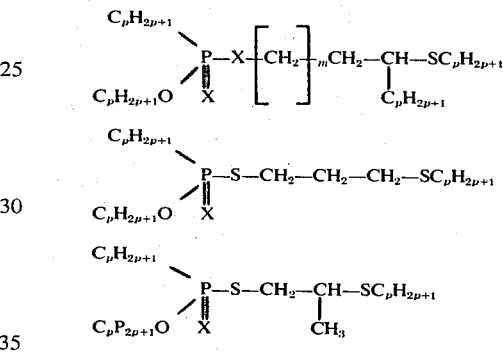

wherein each $p$ is 1 to 4.

In yet another embodiment of this invention, the novel O,S-dithiophosphonates can be employed to prepare novel unsymmetrical dithiophosphonic acid S,S-diesters. Such preparation involves a combination of dealkylation and alkylation reactions which are carried out in the liquid phase. Most generally, this combination of reactions can be schematically represented in the following manner.

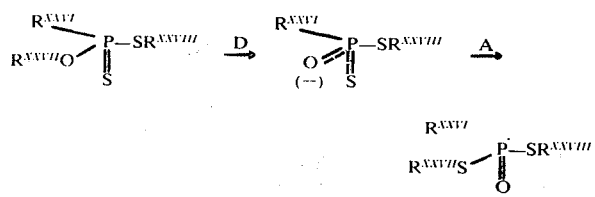

wherein $R^{XXVI}$ is selected from the group consisting $C_1$ to $C_4$ alkyl including monosubstituted derivatives thereof, phenyl and substituted phenyl; $R^{XXVII}$ is a $C_1$ to $C_4$ alkyl; $R^{XXVIII}$ is selected from the group comprising $C_2$ to $C_8$ alkenyl including monosubstituted derivatives thereof, $C_2$ to $C_8$ substituted alkyl; $C_6$ to $C_{12}$ aryl, $C_6$ to $C_8$ substituted aryl, substituted heteroaryl, and $C_2$ to $C_{12}$ heterocyclic; D is a dealkylating agent, preferably a nitrogen or phosphorus base or a thiolate or inorganic salt; A is an alkylation agent, preferably an alkyl halide, alkyl sulfonate, dialkyl sulfate, alkyl phosphate, trialkyl phosphite or the combination of such an alkylating agent with another alkylating agent such as a thiol.

The following types of reactions were realized as capable of being able to produce the novel unsymmetrical S,S'-dihydrocarbylthiophosphonates of the subject invention. They are illustrated as follows:

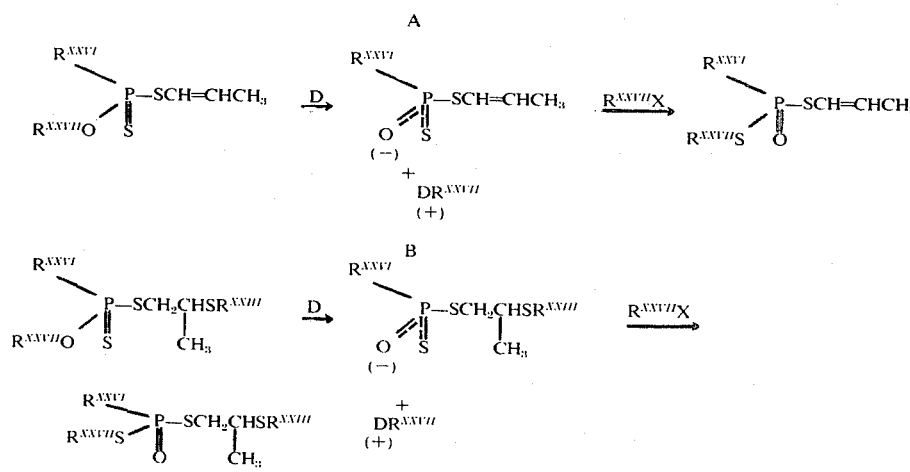

In the above schematic reactions, all the R groups are the same as previously defined. X is a halogen atom.

Any of the novel O,S-dithiophosphonates mentioned hereinabove may be employed as the starting materials for the above-described reactions in producing unsymmetrical thiophosphonic S,S'-diesters. We have surprisingly observed that dealkylation of the thiophosphonic O,S-diester occurs at the O-ester portion of the molecule.

The dealkylating agents (D) useful in the subject processes are preferably selected from the following groups:

          
   I                II             III wherein $R^{xxix}$ is hydrogen, a $C_1$ to $C_8$ alkyl or monosubstituted alkyl, preferably hydrogen and $C_1$ to $C_4$ alkyl, most preferably methyl, G is a nitrogen or phosphorus base; $R^{xxx}$ is a $C_1$ to $C_8$ hydrocarbyl, preferably $C_1$ to $C_4$ alkyl; M is an alkali or alkaline earth metal, tetraalkylammonium or tetraalkylphosphonium; X is chlorine, bromine or iodine.

Suitable dealkylation reagents for the subject reactions are as follows:

I. Ammonia, propylamine, diethylamine, trimethylamine, tetramethylethylenediamine, N-methyl pyrrolidine, hydroxyethylamine, benzyldimethylamine, triethylenediamine, trimethylphosphine, tributylphosphine, phosphine and other nitrogen and phosphorus bases.

II. Sodium methane thiolate, potassium ethane thiolate, potassium ethyl xanthate, tetramethylammonium propane thiolate, sodium hydrogen sulfide, and other thiolate salts.

III. Lithium chloride, sodium iodide, calcium chloride, tetrabutylammonium iodide, tetrahexylphosphonium bromide, and similar metal and ammonium salts.

Suitable non-limiting examples of the alkylating agents include methyl bromide, ethyl chloride, n-propyl bromide, isopropyl iodide, hexadecylchloride, methyl tosylate, trimethyl phosphite, trimethyl phosphate, tripropyl phosphite, and the like.

The process conditions for the dealkylation and alkylation of the dithiophosphonic acid O,S-diesters can be carried out under the following reaction conditions.

For the dealkylation step, preferably equimolar reactants are used. However, an excess of the base reactant may be employed with advantage. The dealkylation can be carried out with or without solvent. However, the use of a solvent is usually preferred. In addition, the utilization of strongly polar neutral organic solvents such as acetonitrile, ethanol and acetone is particularly advantageous.

Dealkylating temperatures can vary from about −50° to about +150°C., preferably from about 25° to about 120°C. The pressure employed is usually atmospheric. In the case of volatile dealkylating agents, however, superatmospheric pressures up to 50 atmospheres can be used to keep the reactants in a liquid reaction phase. The dealkylation reaction is carried out for a time sufficient to substantially convert the starting dithiophosphonate esters to the corresponding salts. Reaction times ranging from about 1 to 100 hours are common. Periods ranging from 3 to 24 hours are preferred.

The alkylation can be carried out with or without a solvent, however, it is usually advantageous to use a solvent. The preferred solvents are polar organic compounds such as nitriles, ketones, alcohols, etc. Hydrocarbons and their chlorinated derivatives such as xylene, chlorobenzene and so forth are also suitable. An excess of the alkyl halide reactant can be used to serve as a solvent as well.

The alkylating temperatures vary from about 0° to 150°, preferably from about 25° to about 120°C. The temperature of the reaction mixture can be brought up to a point where the alkylation occurs at an advantageous rate. However, it is often preferable to heat up one reactant to the desired reaction temperature and then to add the other.

The pressure of the alkylation is usually atmospheric. In the case of volatile alkyl halide reactants, however, the use of superatmospheric pressure can be preferable in order to keep them in a liquid reaction phase. Pressures up to about 50 atmospheres can be used.

Specific examples of the new unsymmetrical dithiophosphoric acid S,S-diesters produced by the novel methods described hereinabove are as follows:

S-propyl-S'-propenyl propanedithiophosphonate

S-propyl-S'-(2-methylthio)propyl ethanedithiophosphonate
S-propyl-S'-propenyl ethanedithiophosphonate
S-ethyl-S'-(2-ethylthio)propyl benzenedithiophosphonate
S-propyl-S'-(2-ethylthio)propyl ethanedithiophosphonate
S-propyl-S'-(2-hexylthio)propyl ethanedithiophosphonate
S-methyl-S'-(2-ethylthio)propyl ethanedithiophosphonate
S-propyl-S'-(2-methylthio)propyl ethanedithiophosphonate
S-ethyl-S'-(3-ethylthio)propyl benzenedithiophosphonate
S-ethyl-S'-(3-ethylthio)butyl benzenedithiophosphonate
S-propyl-S'-phenyl methanedithiophosphonate
S-ethyl-S'-naphthyl benzenedithiophosphonate
S-butyl-S'-(3-dimethylphenyl) ethanedithiophosphonate
S-methyl-S'-(5,8-dimethyl-2-naphthyl) propanedithiophosphonate In still another embodiment of the invention a thiol compound is added to an unsaturated, unsymmetrical dithiophosphoric acid S,S'-diester to produce novel pesticial compositions

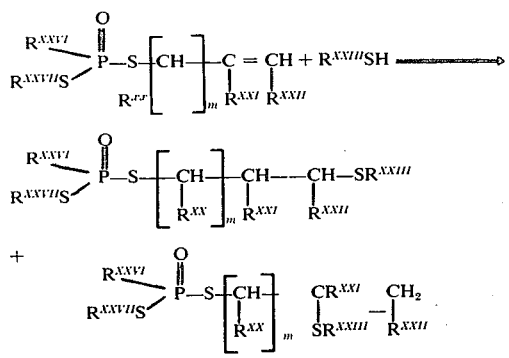

wherein $m$, $R^{XX}$, $R^{XXI}$, $R^{XXII}$, $R^{XXIII}$, $R^{XXVI}$, and $R^{XXVII}$ are as defined previously.

Examples of the new products produced by the claimed process are S-2-methylthiopropyl S'-propyl ethanedithiophosphonate, S-2-ethylthiopropyl S'-ethyl ethylthiomethanedithiophosphonate, S-2-phenylthiobutyl S'-n-propyl 2-methylthioethanedithiophosphonate, S-2-methylthiopropyl S'-ethyl benzenedithiophosphonate, S-3-methylthiopropyl S'-ethyl methyloxymethanedithiophosphonate, S-3-(2-benzothiazolylthio) propyl S'-i-butyl ethanedithiophosphonate, S-3-α-thienylthiopropyl S'-ethyl methanedithiophosphonate, S-i-(1-methylthio)-propyl S'-propyl ethanedithiophosphonate, S-i-[1-(4-methylthio) phenylthio] propyl S'-ethyl i-propyloxymethanedithiophosphonate, S-2-(3,4-dichlorophenylthio) propyl S'-ethyl 3-chloropropanedithiophosphonate.

The claimed thiol additions can be effected in the liquid phase from −150°C to +150°C preferably from 0° to +130°C. The pressure is usually atmospheric. However, superatmospheric pressure can be used with advantage to keep volatile reactants in the liquid reaction phase. The ratio of the thiol to olefin reactant can vary from 0.5:1 to 10:1, preferably 1:1 to 5:1. The reactions can be carried out in the presence or in the absence of added reaction catalysts, initiators and inhibitors. The amount of added reaction catalyst, initiator and inhibitor can vary from 20 to 0.01 percent, preferably 10 to 0.01 percent, most preferably 0.2 to 5 percent. The reaction is usually carried out in the absence of any solvent. However, solvents can be used to advantage in the case of solid and gaseous reactants. Solvent may also be preferred to control the reaction temperatures. Suitable solvents include aliphatic alcohols such as methanol, ethers and thioethers such as dimethyl sulfide, hydrocarbons such as toluene, cyclohexane, carboxylic acids such as acetic acid, ketones such as acetone. The solvents are selected in such a manner as to avoid side reactions, e.g., between the solvent and the reactants.

To initiate the free radical additions to S-vinylic thiophosphonates and S-allyl sulfides, a free radical type initiator is used. Such an initiator is radiation and/or a chemical initiator. Examples of radiation initiation are ultraviolet light, gamma rays, heat. Chemical free radical initiators include azo compounds such as azo-bis-isobutyronitrile, peroxides such as di-t-butyl peroxide, benzoyl peroxide, t-butyl hydroperoxide.

To accelerate the ionic additions to S-allyl thiophosphonates and sulfides cationic catalysts are used. Such catalysts include Lewis acids such as boron trifluoride, perchloric acid, methanesulfonic acid, polyphosphoric acid, sulfuric acid. Thiophosphonic acids and thiols are themselves acidic and as such can be cationically added to said S-allyl compounds without any added catalysts. However, especially in the case of thiol adding agents heat is necessary to achieve a practical rate of conversion. Raising the temperature increases the rate of the ionic addition. However, heat also initiates the free radical addition. To avoid a concurrent free radical addition, inhibitors may be used. Applicable radical inibitors include sulfur, dialkyl polysulfides, hindered phenols, hydroquinones.

In general, the rate of the free radical reactions, once initiated, is less influenced by the temperature of the reaction. To carry out said addition in a clean free radical manner, untraviolet or gamma ray radiation initiated reactions are among the preferred. Low temperature chemical initiators can be also used to the same end.

The additions are generally run to achieve a substantial, i.e., greater than 40 percent conversion of the unsaturated reactant. The reaction time necessary is dependent on the initiator and the catalyst used. In the case of chemical free radical initiators, such a reaction temperature is selected so that the half life of the initiator will be several hours. Similarly, the proper intensity of the radiation initiation is selected. The temperature and time of ionic reactions can be controlled by the gradual addition of one of the reactants.

After the addition is discontinued, low molecular weight thiol reactants can be purged. Thiophosphonic acids can be removed by converting them into their water soluble salts, e.g, with 5 percent aqueous sodium hydrogen carbonate solution. The neutral crude product can be usually purified by fractional distillation in vacuo.

The resulting adducts were found to be surprisingly useful as pesticides. Particularly those adducts are useful in this respect which have molecular weights below 500. This molecular weight limitation is especially important with regard to the systemic pesticidal action of the adducts. For a systemic action the adduct should have less than 300 molecular weight.

In the case of hydrocarbon thiophosphonic acid adduct derivatives some of the preferred new compositions for pesticidal use are the following:

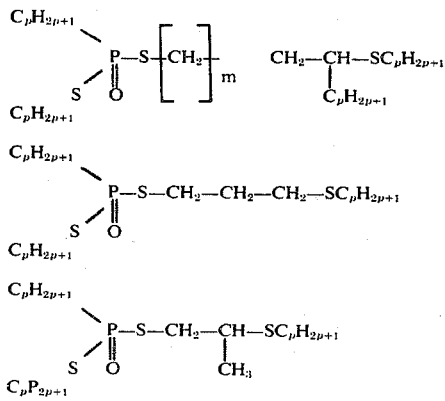

wherein each $p$ is 1 to 4 and m is 0 or 1.

As previously noted, the products of this invention are useful as pesticides, particularly as insecticides. When used as insecticides, the foregoing biologically active adducts are preferably formulated with a suitable carrier or diluent or combinations thereof.

The term "carrier" or "diluent" as used herein means a material, which can be inorganic or organic and synthetic or of natural origin, with which the active ingredient of this invention is mixed or formulated to facilitate its storage, transport, and handling and application to the insect(s) to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be naturally occurring minerals—although subsequently subjected to grinding, sieving, purification, and/or other treatments —including, for example, gypsum; tripolite; diatomaceous earth; mineral silicates such as mica, vermiculite, talc, and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the unsaturated or halogenated dithiophosphonic or dithiophosphinic acid adduct active ingredient.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575°F., or boiling in the range of about 575° to about 1,000°F. and having an unsulfonatable residue of at least about 75 percent and preferably of at least about 90 percent, or mixtures of these two types of oil, are particularly suitable liquid carriers.

For application as a soil insecticide, the preferable carrier should be a granular inert carrier for example 25/50 mesh (U.S. sieve size) or can also be a simple or compound fertilizer which can be a solid, preferably granular or pelleted, or a liquid, as for example an aqueous solution in which the toxicant is suspended or emulsified.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the unsaturated or halogenated dithiophosphonic or dithiophosphinic acid adduct mixed with a dispersing, i.e., deflocculating or suspending, agent, and, if desired, a finely divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule; for example, the sodium secondary alkyl sulfates, dialkyl sodium sulfosuccinate available under the registered trademark "Teepol", sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the active ingredient or by granulating a mixture of a finely divided solid carrier and the active ingredient. The carrier used can consist of or contain a fertilizer or fertilizer mixture, as, for example, a superphosphate.

The compositions of this invention can also be formulated as solutions of the active ingredient in an organic solvent or mixture of solvents, such as for example alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73°F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a non-aqueous phase.

The present invention is further illustrated in greater detail by the following examples, but it is to be understood that the present invention, in its broadest aspects, should not necessarily be limited in terms of the reactants, or specific temperatures, residence time, separation techniques, pressures, solvents used, and other process conditions, or dosage levels, insects tested, exposure times, etc. by which the compounds and/or compositions described and claimed are prepared and/or used.

EXAMPLE 1

Addition of O-ethyl benzenedithiophosphonic acid to methylacetylene

A mixture of 87.3 grams (0.4 mole) of O-ethyl benzenedithiophosphonic acid and 44 grams (1.1 moles) of methylacetylene is irradiated at 15°C. with ultra-violet light from a high pressure mercury arc of a hundred watt Hanau immersion lamp for five days with magnetic stirring in a closed quartz tube. After releasing the excess methacetylene, the liquid product was dissolved in 200 ml. of ether. Unreacted O-ethyl benzenedithiophosphonic acid was removed by washing the ether solution with nine 25 ml. portions of 5 percent aqueous sodium hydrogen carbonate solution, until the washings were neutral. According to the amount of sodium hydrogen carbonate needed for neutralization, the crude reaction mixture contained 32 percent unreacted O-ethyl benzenedithiophosphonic acid. The ether solution was then washed with one or more 25 ml. portions of 5 percent aqueous sodium hydrogen carbonate solutions and with 25 ml. of water. It was then dried over anhydrous sodium sulfate and the solvent evaporated in vacuo to yield 48 grams (39 percent) of a yellow liquid. Gas liquid chromatography (GLC) of this product indicated that it was about 83 percent pure. A fractional distillation of this crude product yielded 19.4 grams (19 percent) of the yellow liquid adduct, boiling in the range of 131°–132°C. at 0.15 mm. pressure. Based on the amount of O-ethyl benzenedithiophosphonic acid consumed in this reaction, the yield of distilled product was 28 percent. The nuclear magnetic resonance (NMR) spectrum of the distilled product was consistent with the structure of the mono-adduct. Elemental analysis: Calculated for $C_{11}H_{15}OPS_2$: C, 51.14; H, 5.85 Found: C, 50.99; H, 6.10.

EXAMPLE 2

Addition of O-ethyl benzenedithiophosphonic acid to 1,3-butadiene

A mixture of 43.6 grams (0.2 mole) of O-ethyl benzenedithiophosphonic acid and 11.1 grams (0.206 mole) of 1,3-butadiene was reacted for 43 hours in the manner described in Example 1. The reaction mixture was dissolved in ether, washed with 5 percent aqueous sodium hydrogen carbonate solution and with water, and was dried as described in Example 1. According to the amount of sodium hydrogen carbonate needed for neutralization, the crude reaction mixture contained 44 percent unreacted O-ethyl benzenedithiophosphonic acid. The solvent was removed in vacuo to yield 25.4 grams (37 percent) of a yellow liquid which was 80 percent pure according to GLC. Fractional distillation of this crude product yielded 14.2 grams (26 percent) of the yellow liquid adduct, boiling in the range of 143°–147°C. at 0.2 mm. pressure. Based on the amount of O-ethyl benzenedithiophosphonic acid consumed in this reaction, the yield of distilled product was 37 percent. The NMR spectrum of the distilled product was consistent with the structure of the 1,4-mono-adduct.

Elemental analysis: Calculated for $C_{12}H_{17}OPS_2$: C, 52.92; H, 6.29; P, 11.37. Found: C, 52.53; H, 6.44; P, 11.45.

EXAMPLE 3

Addition of O-ethyl benzenedithiophosphonic acid to allene

A mixture of 40 grams (0.18 mole) of O-ethyl benzenedithiophosphonic acid and 25 grams (0.62 mole) of allene was reacted for seven days in a manner described in Example 1. The reaction mixture was dissolved in ether, washed with 5 percent aqueous sodium hydrogen carbonate solution and then with water, and was dried as described in Example 1. According to the amount of sodium hydrogen carbonate needed for the neutralization, the crude reaction mixture contained 41 percent unreacted O-ethyl benzenedithiophosphonic acid. The solvent was removed in vacuo to yield 20.9 grams (30 percent) of a yellow liquid which was 68 percent pure according to GLC. Fractional distillation of this crude product yielded 8.8 grams (19 percent) of the yellow liquid adduct, boiling in the range of 129°–132°C. at 0.2 mm. pressure. Based on the amount of O-ethyl benzenedithiophosphonic acid consumed in this reaction, the yield of distilled product was 32 percent. The NMR spectrum of the distilled product showed that it contained about 80 percent of the expected O-ethyl-S-allylbenzenedithiophosphonate and 20 percent of the ionic diadduct $[C_2H_5OP(\phi)S_2]_2C(CH_3)_2$.

Elemental analysis: Calculated for $C_{11}H_{15}OPS_2$: C, 51.14; H, 5.58; P, 11.99. Found: C, 51.21; H, 6.55; P, 11.56.

EXAMPLE 4

Addition of O-ethyl benzenedithiophosphonic acid to vinyl chloride

A mixture of 39 grams (0.18 mole) of O-ethyl benzenedithiophosphonic acid and 15 grams (0.24 mole) of vinyl chloride was reacted for 13 days in the manner described in Example 1. The reaction mixture was dissolved in ether, washed with 5 percent aqueous sodium hydrogen carbonate solution and then with water, and was dried as described in Example 1. According to the amount of sodium hydrogen carbonate needed for neutralization, the crude reaction mixture contained 41 percent unreacted O-ethyl benzenedithiophosphonic acid. The solvent was removed in vacuo to yield 19.1 grams (29 percent) of an orange liquid which was 75 percent pure according to GLC. Based on the amount of O-ethyl benzenedithiophosphonic acid consumed in this reaction, the yield was 48 percent. The NMR spectrum was consistent with the structure of the adduct.

Elemental analysis: Calculated for $C_{10}H_{14}ClOPS_2$: C, 42.78; H, 5.30; P, 11.03. Found: C, 43.60; H, 5.88; P, 10.05.

EXAMPLE 5

Addition of O-ethyl ethanedithiophosphonic acid to methyl-acetylene

A mixture of 68 grams (0.4 mole) of O-ethyl ethanedithiophosphonic acid and 45 grams (0.12 mole) of methylacetylene was reacted for 3 days in a manner described in Example 1. The reaction mixture was dissolved in ether, washed with 5 percent aqueous sodium hydrogen carbonate solution and then with water, and was dried as described in Example 1. According to the amount of sodium hydrogen carbonate needed for neutralization, the crude reaction mixture contained only 4 percent unreacted O-ethyl ethanedithiophosphonic acid. The solvent was removed in vacuo to yield 68 grams (75 percent) of a yellow liquid which was 98 percent pure according to GLC. A fractional distillation of a 6-gram sample of this crude product yielded 3.92 grams (65 percent) of the colorless liquid adduct, boiling in the range of 74°–75°C. and 0.3 mm. pressure. Based on the amount of O-ethyl ethanedithiophosphonic acid consumed in this reaction, the yield of crude product was 83 percent and the yield of distilled product was 68 percent. The NMR spectra of both crude and distilled products were consistent with the structure of the monoadduct.

Elemental analysis: Calculated for $C_7H_{15}OPS_2$: C, 39.98; H, 7.19; P, 14.73. Found: C, 40.61; H, 7.55; P, 13.73.

EXAMPLE 6

Addition of O-ethyl ethanedithiophosphonic acid to phenylacetylene

A mixture of 35 grams (0.21 mole) of O-ethyl ethanedithiophosphonic acid and 63 grams (0.62 mole) of phenylacetylene was reacted for 2 days in a manner described in Example 1. However, after the action, the excess phenylacetylene, a liquid under ordinary conditions, was not removed from the reaction mixture. The crude reaction mixture was dissolved in ether, washed with 5 percent aqueous sodium hydrogen carbonate solution and then with water, and was dried as described in Example 1. According to the amount of sodium hydrogen carbonate needed for neutralization, the crude reaction mixture contained 15 percent unreacted O-ethyl ethanedithiophosphonic acid. The solvent was removed in vacuo to yield 46 grams (71 percent) of a yellow liquid which was 88 percent pure according to GLC. The NMR spectrum was consistent with the structure of the mono-adduct. Based on the amount of O-ethyl ethanedithiophosphonic acid consumed in this reaction, the yield was 84 percent.

EXAMPLE 7

Addition of O-ethyl ethanedithiophosphonic acid to ethyl propiolate

A mixture of 26 grams (0.15 mole) of O-ethyl ethanedithiophosphonic acid and 50 grams (0.51 mole) of ethyl propiolate was reacted for 13 days in a manner described in Example 1. However, after the reaction, the excess ethyl propiolate, a liquid under ordinary conditions, was not removed from the reaction mixture. The crude reaction mixture was dissolved in ether, washed with 5 percent aqueous sodium hydrogen carbonate solution and then with water, and was dried as described in Example 1. The solvent was then removed in vacuo to yield 39 grams (68 percent) of a brown liquid which was 70 percent pure according to GLC.

EXAMPLE 8

Addition of diphenyl dithiophosphinic acid to methylacetylene

To a solution of 62.5 grams (0.25 mole) of diphenyl dithiophosphinic acid in 20 grams dimethyl sulfide, 42 grams (1.05 mole) of methylacetylene were added in a quartz pressure tube. The tube was then closed and the magnetically stirred liquid reaction mixture irradiated at 15°C. An NMR spectrum of a sample taken after 48 hours indicated the formation of about 80 percent free radical type mono-adduct, i.e., propenyl diphenyl dithiophosphinate. After 137 hours of irradiation, the reaction was discontinued. The weight of the crude reaction product after the removal of the excess methylacetylene and dimethyl sulfide solvent indicated an essentially complete reaction of the starting dithiophosphonic acid. Nevertheless, to remove any acid present, a 15 percent ether solution of crude product was washed with a 5 percent aqueous sodium hydrogen carbonate solution. After drying and removal of the ether in vacuo, 61.5 grams of a slightly viscous, green, neutral product representing a 90 percent yield calculated for the mono-adduct was obtained. NMR confirmed the expected structure of the adduct and indicated about 85 percent purity.

EXAMPLE 9

Addition of dimethyldithiophosphinic acid to acetylene

In 50 ml. acetone, 12.6 grams (0.1 mole) of dimethyl dithiophosphinic acid are dissolved. The solution is then placed into a quartz pressure tube and 20.8 grams (0.8 mole) of acetylene is condensed to it. The tube is then closed and irradiated as described in the previous examples to effect free radical addition.

Work-up of the reaction mixture after the extraction of the acid by distillation in vacuo yields vinyl dimethyl dithiophosphinate as a distillate and ethylene bis-dimethyl dithiophosphinate as a residue.

EXAMPLE 10

Addition of O-ethyl methanedithiophosphonic acid to acetylene

An excess of acetylene is reacted with O-ethyl methanedithiophosphonic acid in the manner described in the previous example to yield vinyl O-ethyl methanedithiophosphonate and ethylene bis-(o-ethyl methanedithiophosphonate).

EXAMPLE 11

Addition of O-Fluoroethyl Methanedithiophosphonic Acid to Dimethylbutadiene

A mixture of 17.4 g. (0.1 mole) of fluoroethyl methanedithiophosphonic acid and 8.2 g (0.1 mole) dimethylbutadiene was reacted as described in Example 2 to yield S-2,3-dimethylbutene-2-yl O-fluoroethyl methanedithiophosphonate.

EXAMPLE 12

S-Propyl-S'-propenyl Propanedithiophosphonate

A solution of 25 g. (0.11 mole) of O-ethyl-S-propenyl propanedithiophosphonate and 13 g. (0.12 mole) of triethylene diamine in 100 ml of acetonitrile was refluxed (83°–85°) for 6 hours. The mixture was cooled to room temperature and 27 g. (0.22 mole) of 1-bromo-propane was added. Heating was then continued at 72°–75° for 6 hours, during which time a heavy precipitate was formed, requiring the addition of 100 ml more acetonitrile. The reaction mixture was then filtered and the precipitate washed with acetonitrile. The filtrate was concentrated in vacuum and the residue dissolved in 250 ml of ether. This ether phase was washed with 50 ml of water, with 50 ml of 5 percent aqueous sodium bicarbonate, and again with 50 ml of water, dried over sodium sulfate, and the ether removed in vacuum to give 26.8 g (40 percent yield) of the light brown liquid crude product, which was 40 percent pure by GLC. Distillation of this crude product gave a 21 percent yield of the orange liquid product, b.p. 100°–107° at 0.10 mm Hg. NMR analysis of this material indicated the desired structure.

Elemental Analysis for $C_{19}H_{19}OPS_2$: C, 45.35; H, 8.04; P, 13.00

Found: C, 45.22; H, 7.95; P, 11.28

EXAMPLE 13

S-Propyl-S'-(2-methylthio)propyl Ethanedithiophosphonate

O-Ethyl-S-(2-methylthio)propyl ethanedithiophosphonate was treated in the same manner as described in Example 12 except that heating was carried out for 15 hours before the addition of 1-bromopropane, and for 16 hours afterwards. The orange-brown liquid product was thus obtained in 60 percent yield.

EXAMPLE 14

S-Propyl-S'-propenyl Ethanedithiophosphonate

O-Ethyl-S-propenyl ethanedithiophosphonate was treated in the same manner as described in Example 12 except that heating was carried out for 22 hours before the addition of 1-bromopropane, and for 16 hours afterwards. The crude brown liquid product was thus obtained in 50 percent yield, 56 percent pure by GLC. Distillation of this crude material gave a 30 percent yield of the yellow liquid product, b.p. 104°–105° at 0.08 mm Hg.

Elemental analysis for $C_8H_{17}OPS_2$: C, 42.83; H, 7.64; P, 13.81

Found: C, 42.69; H, 7.44; P, 12.83

EXAMPLE 15

S-Propyl-S'-propenyl Benzenedithiophosphonate

O-methyl-S-propenyl benzenedithiophosphonate was treated in the same manner as described in Example 12 except that heating was carried out for 13 hours before the addition of 1-bromopropane, and for 17 hours afterwards. The orange liquid product was thus obtained in 37 percent yield.

EXAMPLE 16

S-Propyl-S'-(2-ethylthio)propyl Methanedithiophosphonate

O-methyl-S-(2-ethylthio)propyl methanedithiophosphonate was treated in the same manner as described in Example 12 except that heating was carried out for 16 hours before the addition of 1-bromopropane, and for 8 hours afterwards. The crude dark yellow liquid product was then distilled to give a 15 percent yield of the pale yellow liquid product, b.p. 132°–137° at 0.4 mm Hg.

EXAMPLE 17

O-Ethyl-S-(2-methylthio)propyl Ethanedithiophosphonate

A mixture of 42 grams (0.20 mole) of O-ethyl-S-propenyl ethanedithiophosphonate and 13 grams (0.27 mole) of methanethiol was irradiated at 15°C. with ultra-violet light from a high pressure mercury arc of 200-watt Hanau immersion lamps at a distance of about 5 cm for 13 days with magnetic stirring in a closed quartz tube. The excess methanethiol was then removed in vacuo to give 43.5 grams (72 percent) of a yellow liquid which was 85 percent pure by gas-liquid chromatography (GLC). Nuclear magnetic resonance (NMR) spectroscopy indicated that 94 percent of the S-propenyl ester had reacted. A fractional distillation of this crude product yielded 24.2 grams (47 percent) of the yellow liquid product, boiling in the range of 103°–106°C. at 0.2 mm pressure. The nuclear magnetic resonance (NMR) spectrum of the distilled product was consistent with the structure of the expected product.

Elemental analysis: Calculated for $C_8H_{19}OPS_3$ (258.406): C, 37.18; H, 7.41; P, 11.99.
Found: C, 38.04; H, 8.20; P, 11.46.

EXAMPLE 18

O-Ethyl-S-(2-ethylthio)propyl Methanedithiophosphonate

A mixture of 15.4 grams (0.079 mole) of O-ethyl-S-propenyl methanedithiophosphonate and 8 grams (0.13 mole) of ethanethiol was irradiated for 69 days under the same conditions described in Example 17. The excess ethanethiol was then removed in vacuo to give a 52 percent yield of the crude orange liquid product, which was 48 percent pure by GLC. A fractional distillation of this crude product yielded 7.0 grams (34 percent) of the pale yellow liquid product, boiling in the range of 100°–104°C. at 0.18 mm pressure.

Elemental analysis: Calculated for $C_8H_{19}OPS_{13}$ (258.406): C, 37.18; H, 7.41; P, 11.99.
Found: C, 37.17; H, 7.10; P, 11.86.

EXAMPLE 19

O-Ethyl-S-(2-ethylthio)propyl Benzenedithiophosphonate

A mixture of 5.3 grams (0.020 mole) of O-ethyl-S-propenyl benzenedithiophosphonate and 3 grams (0.048 mole) of ethanethiol was irradiated for 6 days under the same conditions described in Example 17, except that a 450-watt immersion lamp was used. The excess ethanethiol was then removed in vacuum to give 6.2 grams (90 percent) of the brown liquid product which was 90 percent pure according to NMR.

Elemental analysis: Calculated for $C_{13}H_{21}OPS_3$ (320.477): C, 48.72; H, 6.61; P, 9.66.
Found: C, 47.80; H, 6.67; P, 8.39.

EXAMPLE 20

O-Propyl-S-(2-ethylthio)propyl Ethanedithiophosphonate

A mixture of 17 grams (0.076 mole) of O-propyl-S-propenyl ethanedithiophosphonate and 10 grams (0.16 mole) of ethanethiol was irradiated for 6 days under the same conditions described in Example 19. GLC analysis indicated that 65 percent of the S-propenyl ester had reacted after 3 days irradiation and 88 percent after 6 days. The excess ethanethiol was then removed in vacuum to give a 62 percent yield of the crude brown liquid product, which was 56 percent pure by GLC. A fractional distillation of this crude product yielded 9.9 grams (46 percent) of the yellow liquid product, boiling in the range of 112°–113°C. at 0.09 mm pressure. The NMR spectrum of the distilled material was consistent with the structure of the expected product.

Elemental analysis: Calculated for $C_{10}H_{23}OPS_3$ (286.460): C, 41.93; H, 8.09; P, 10.81.
Found: C, 41.36; H, 8.09; P, 10.13.

EXAMPLE 21

O-Methyl-S-(2-ethylthio)propyl Ethanedithiophosphonate

A mixture of 12 grams (0.061 mole) of O-methyl-S-propenyl ethanedithiophosphonate and 4.9 grams (0.077 mole) of ethanethiol was irradiated for 8 days under the same conditions described in Example 19. GLC analysis indicated that 30 percent of the S-propenyl ester had reacted after 2.5 days irradiation, 73 percent after 5 days, and 80 percent after 8 days. The excess ethanthiol was then removed in vacuum to give 14.2 grams (38 percent) of the yellow liquid which was 42 percent pure by GLC. A fractional distillation of this crude product yielded 4.7 grams (30 percent) of the colorless liquid product, boiling in the range of 99°–105°C. at 0.06 mm pressure. The NMR spectrum of the distilled material was consistent with the structure of the expected product.

Elemental analysis: Calculated for $C_8H_{19}OPS_3$ (258.406): C, 37.18; H, 7.41; P, 11.99.
Found: C, 38.19; H, 7.47; P, 10.69.

EXAMPLE 22

O-Propyl-S-(2-hexylthio)propyl Ethanedithiophosphonate

A mixture of 11 grams (0.049 mole) of O-propyl-S-propenyl ethanedithiophosphonate and 12 grams (0.10 mole) of 1-hexanethiol was irradiated for 7 days under the same conditions described in Example 19. The excess hexanethiol was then removed in vacuum to give an 83 percent yield of the yellow liquid product, which was 71 percent pure by GLC. The NMR spectrum of this material was consistent with the structure of the expected product.

Elemental analysis: Calculated for $C_{14}H_{31}OPS_3$ (342.568): C, 40.09; H, 9.12; P, 9.04
Found: C, 48.26; H, 8.31; P, 8.82.

EXAMPLE 23

O-Propyl-S-(2-methylthio)propyl Ethanedithiophosphonates

A mixture of 19 grams (0.085 mole) of O-propyl-S-propenyl ethanedithiophosphonate and 18 grams (0.37 mole) of methanethiol was irradiated for 11 days under the same conditions described in Example 8. The excess methanethiol was then removed in vacuum to give a 93 percent yield of the pale yellow liquid product, which was 82 percent pure by GLC. The NMR spectrum of this material was consistent with the structure of the expected product.

Elemental analysis: Calculated for $C_9H_{21}OPS_3$ (272.433): C, 39.68; H, 7.77; P, 11.37.
Found: C, 40.30; H, 7.22; P, 11.21.

EXAMPLE 24

O-Ethyl-S-(3-ethylthio)propyl Benzenedithiophosphonate

A mixture of 2.7 grams (0.010 mole) of O-Ethyl-S-allyl benzenedithiophosphonate and 10 grams (0.16 mole) of ethanethiol was irradiated for 8 days under the same conditions described in Example 19. The reaction mixture was then diluted with 200 ml of ether, wased with 25 ml. of 5 percent aqueous sodium bicarbonate solution to remove any acidic by-products and then with 25 ml of water, dried over sodium sulfate, and the solvent removed in vacuum to give the brown liquid product. The NMR spectrum of this material was consistent with the structure of the desired product.

EXAMPLE 25

O-Ethyl-S-(3-ethylthio)butyl Benzenedithiophosphonate

A mixture of 7 grams (0.026 mole) of O-ethyl-S-(2-butenyl) benzenedithiophosphonate and 10 grams (0.16 mole) of ethanethiol was irradiated for 12 days under the same conditions described in Example 19. The reaction mixture was then diluted with 200 ml. of ether, washed with 25 ml. of 5 percent aqueous sodium bicarbonate solution to remove any acidic by-products and then with 25 ml of water, dried over sodium sulfate, and the solvent removed in vacuum to give the yellow liquid product in 73 percent yield. The NMR spectrum of this material was consistent with the structure of the desired product.

Elemental analysis: Calculated for $C_{14}H_{23}OPS_3$ (334.504): C, 50.27; H, 6.93; P, 9.26.
Found: C, 50.30; H, 7.04; P, 9.13.

EXAMPLE 26

O-Ethyl-S-(3-methylthio)propyl Methanedithiophosphonate

A mixture of 25 grams (0.16 mole) of O-ethyl methanedithiophosphonic acid and 13 grams (0.15 mole) of allyl methyl sulfide was irradiated for 25 days under the same conditions described in Example 19. The reaction mixture was then diluted with 250 ml. of ether, washed 5 times with 50 ml. portions of 5 percent aqueous sodium bicarbonate solution and once with 50 ml. of water, dried over sodium sulfate, and the solvent removed in vacuum to give 10.6 grams of the pale yellow liquid product.

EXAMPLE 27

O-Ethyl-S-(3-ethylthio-2-butyl) Ethanedithiophosphonate

A mixture of 11 grams (0.049 mole) of O-ethyl-S-(2-butenyl-2) ethanedithiophosphonate and 6.5 grams (0.10 mole) of ethanethiol was irradiated for 30 days under the same conditions described in Example 19. The excess ethanethiol was then removed in vacuum to give a 55 percent yield of the dark brown liquid product, which was 72 percent pure by GLC.

EXAMPLE 28

O-Methyl-S-(2-methylthio)propyl Ethanedithiophosphonate

A mixture of 13 grams (0.066 mole) of O-methyl-S-propenyl ethanedithiophosphonate and 10 grams (0.2 mole) of methanethiol was irradiated for 20 days under the same conditions described in Example 19. The excess methanethiol was then removed in vacuum to give a 62 percent yield of the dark brown liquid product, which was 75 percent pure by GLC.

Elemental analysis: Calculated for $C_7H_{17}OPS_3$ (244.379): C, 34.40; H, 7.01; P, 12.67.
Found: C, 35.48; H, 6.30; P, 14.04.

EXAMPLE 29

O-Ethyl-S-(2-ethylthio)propyl Ethanedithiophosphonate

A mixture of 21 grams (0.10 mole) of O-ethyl-S-propenyl ethanedithiophosphonate and 19 grams (0.3 mole) of ethanethiol was irradiated for 11 days under the same conditions described in Example 19. The excess ethanethiol was then removed in vacuum to give an 80 percent yield of the dark brown liquid product, which was 73 percent pure by GLC.

EXAMPLE 30

O-Methyl-S-(2-ethylthio)propyl Methanedithiophosphonate

A mixture of 51 grams (0.28 mole) of O-methyl-S-propenyl methanedithiophosphonate and 52 grams (0.84 mole) of ethanethiol was irradiated for 6 days under the same conditions described in Example 19. The excess ethanethiol was then removed in vacuum to give an 89 percent yield of the orange liquid product, which was 66 percent pure by GLC.

EXAMPLE 31

O-Methyl-S-(2-methylthio)propyl Methanedithiophosphonate

A mixture of 20 grams (0.11 mole) of O-methyl-S-propenyl methanedithiopheophonate and 16 grams (0.33 mole) of methanethiol was irradiated for 6 days under the same conditions described in Example 19. The excess methanethiol was then removed in vacuum to give an 82 percent of the orange liquid product, which was 72 percent pure by GLC.

EXAMPLE 32

S-Propyl-S-(2-methylthio)propyl Ethanedithiophosphonate

A mixture of S-propyl-S-propenyl ethanedithiophosphonate and methanethiol are reacted as described in Example 19. After removing any excess methanethiol in vacuum, there is obtained a residue consisting of the desired product.

EXAMPLE 33

Pesticidal Effectiveness of Several Dithiophosphonates and Dithiophosphinates

Tests were carried out on several insects, mites, and nematodes using the products of Examples 1–8 and 12 through 31 as the test chemicals. Table I summarizes some of these results.

with the above formulation of the test chemical at 250 ppm. After 2 days the degree of control of the adults was observed, and after 7 days that of the nymphs.

MITE — SYSTEMIC TEST

A potted bean plant, which was infested with the two-spotted spider mite on the previous day was treated by applying 20 ml of the above formulated test chemical to the soil. After 2 days the degree of control of the adults was observed, and after 7 days that of the nymphs.

TABLE I

Pesticidal Activity of Dithiophosphonates
% Mortality[1]

| Product of Example | Mexican Bean Beetle | Southern Army Worm | Mite Contact Adult | Mite Contact Nymph | Mite Systemic Adult | Mite Systemic Nymph | Aphid Contact | Aphid Systemic | House Fly | Corn Root-worm | Nema-tode | Cholinesterase Inhibiting I.D.$_{50}$ (Moles/Liter) |
|---|---|---|---|---|---|---|---|---|---|---|---|---|
| 1 | 100 | 10[2] | 80[2] | — | — | — | 100 | 100[2] | 100 | 100[3] | 40[4] | $6.4 \times 10^{-5}$ |
| 2 | 100[2] | — | — | — | — | — | 50[2] | — | 100[2] | 100[3] | 20[4] | $3.1 \times 10^{-6}$ |
| 3 | 100[2] | — | 70[2] | 20[2] | — | — | 100[2] | 40[2] | 60[2] | 20[3] | 10[4] | $1.0 \times 10^{-5}$ |
| 4 | 100 | — | 100[2] | — | — | — | 80[2] | 50[2] | 60[2] | 80[3] | 40[4] | $3.1 \times 10^{-6}$ |
| 5 | 80[2] | — | 100[2] | — | 80[2] | 100[2] | 100 | 100 | 100 | 100 | 20[4] | $2.5 \times 10^{-5}$ |
| 6 | 100 | 100[2] | 100[2] | 80[2] | — | — | 100 | — | 100 | — | 20[4] | $8.6 \times 10^{-6}$ |
| 7 | 100[2] | — | 90[2] | 50[2] | — | — | 90 | 21 | 100 | — | 90 | $1.9 \times 10^{-5}$ |
| 8 | — | — | — | — | — | — | — | — | — | — | 60 | |
| 12 | 100 | — | 100 | 70 | 100 | 100 | 100 | 100 | 100 | 100 | 10 | $6.4 \times 10^{-9}$ |
| 13 | 100 | — | 100 | 100 | 100 | 100 | 100 | 100 | 100 | 100 | 10 | $1.0 \times 10^{-6}$ |
| 14 | 100 | 80 | 100 | 100 | 100 | 100 | 100 | 100 | 100 | 100 | 40 | $8.4 \times 10^{-7}$ |
| 15 | 100 | 100 | | | — | — | 100 | — | 100 | | 20 | 10 |
| 16 | 100 | 80 | 100 | 100 | 100 | 40 | 90 | 100 | 100 | | | |
| 17 | 70 | | 100 | 100 | 90 | 95 | 100 | 100 | 100 | 20 | 100 | $7.0 \times 10^{-5}$ |
| 18 | 100 | — | 100 | 100 | 100 | 100 | 100 | 100 | 100 | 40 | 90 | $1.8 \times 10^{-7}$ |
| 19 | 100 | — | 100 | — | 100 | 90 | 100 | 30 | 100 | 0 | 10 | $1.7 \times 10^{-6}$ |
| 20 | 100 | — | 100 | 35 | 100 | 95 | 100 | 100 | 100 | 40 | 70 | $6.6 \times 10^{-8}$ |
| 21 | 100 | — | 100 | 100 | 100 | 100 | 100 | 100 | 100 | 100 | 85 | $1.3 \times 10^{-5}$ |
| 22 | — | — | 50 | — | 20 | — | 100 | 30 | 100 | 100 | 10 | $5.4 \times 10^{-7}$ |
| 23 | 100 | — | 80 | 80 | 100 | 100 | 100 | 100 | 100 | 90 | 70 | $9.2 \times 10^{-7}$ |
| 24 | 20 | — | — | — | — | — | — | 30 | 100 | — | 20 | $1.8 \times 10^{-4}$ |
| 25 | 20 | — | — | — | — | — | — | 10 | 60 | — | 40 | $2.1 \times 10^{-4}$ |
| 26 | 100 | — | 100 | 100 | 100 | 100 | 100 | 100 | 100 | 100 | 70 | $3.3 \times 10^{-7}$ |
| 27 | 100 | — | 100 | 50 | — | — | 100 | 100 | 100 | 100 | 40 | $2.0 \times 10^{-6}$ |
| 28 | 100 | — | 100 | 100 | 100 | 100 | 100 | 100 | 100 | 100 | 10 | |
| 29 | 100 | — | 100 | 100 | 100 | 100 | 100 | 100 | 100 | 20 | 10 | |
| 30 | 60 | — | 100 | 100 | 100 | 100 | 100 | 100 | 100 | 40 | 90 | |
| 31 | 100 | — | 90 | 80 | 100 | 100 | 100 | 100 | 100 | 20 | 70 | |

[1]The concentration used was 250 ppm, except in the cases of corn rootworm (2.5 ppm) and nematode (25 lb./A).
[2]Tested at 500 ppm.
[3]Tested at 5 ppm.
[4]Tested at 50 lb./A.

MEXICAN BEAN BEETLE

Bean leaves were sprayed with a formulation of the test chemical in acetone-water (1:20) at 250 ppm, and were allowed to dry. Individual treated leaves were then placed in a Petri dish and 5 Mexican bean beetle larvae were introduced. After 2 days the degree of control was observed.

SOUTHERN ARMY WORM

Bean leaves were sprayed with a formulation of the test chemical in acetone-water (1:20) at 250 ppm, and were allowed to dry. Individual treated leaves were then placed in a Petri dish and 5 Southern army worm larvae were introduced. After 2 days the degree of control was observed.

MITE-CONTACT TEST

A potted bean plant, which was infested with the two-spotted spider mite on the previous day, was sprayed

APHID — CONTACT TEST

A potted nasturtium plant infested with the bean aphid was treated by applying 20 ml of the above formulation of the test chemical at 250 ppm to the soil. After 2 days the degree of control was rated.

APHID — SYSTEMIC TEST

A nasturtium plant in a 2-½ inch pot was infested with the bean aphid and was treated by applying 20 ml of a formulation of the test chemical in acetone at 250 ppm to the soil. After 2 days the degree of control was observed.

HOUSEFLY

Caged flies were sprayed with the above formulated test chemical at 250 ppm. After 2 days the degree of control was rated.

CORN ROOTWORM

Seventy-five ml. (90–100 grams) of an air-dried soil-sand (2:1) mixture was placed in an 8-ounce plasticized cup. Ten ml of a 27.5 ppm formulation of the test chemical, equivalent to 2.5 ppm or 5 lbs. in a 6-inch acre, was pipetted onto the surface of the soil. The cup was then capped, and one hour later it was shaken vigorously 30 times. The cap was removed and two very young corn plants and five corn rootworm larvae (7–10 days old) were introduced. Five days later the degree of mortality was rated.

NEMATODE

One hundred twenty-five ml of an air-dried soil sand (2:1) mixture was infested with a stock of root-knot nematodes prepared 7–10 days previously (at the rate of 6–7 grams of chopped galls per gallon of soil). Ten ml of a 231 ppm formulation of the test chemical (equivalent to 25 lbs. per 6-inch acre) is poured onto the surface. After 1 hour the container was shaken vigorously and then held for 5–7 days. The container was then shaken again, placed in the greenhouse, and seeded with four cucumber seeds. After 3–4 weeks the roots were examined for galls and the degree of control was rated.

CHOLINESTERASE INHIBITION TEST

To a solution of 0.2 unit of bovine cholinesterase in 2.97 ml of a buffer solution containing 11.15 grams of disodium hydrogen phosphate dodecahydrate and 1.81 grams of potassium dihydrogen phosphate per liter of water, 0.03 ml of a solution of the test chemical in acetone was added. This mixture was then incubated in a water bath at 35°C. for 30 minutes. One ml of a solution containing 100 milligrams of 5,5'-dithobis-(2-nitrobenzoic acid), 100 milligrams of acetylthiocholine iodide, and 75 ml of the above buffer solution in sufficient water to make 200 ml was then added and the mixture again incubated in a water bath at 35°C. for 30 minutes. The amount of inhibition of bovine cholinesterase was then determined from the absorbence of this solution at 420 m$\mu$. By using a series of solutions of the test chemical at various concentrations in acetone, the concentration needed for 50 percent inhibition was determined.

From the foregoing, it will be understood that the above description is merely illustrative of preferred embodiments and specific examples of the present invention and that variations may be made in such embodiments and examples by those skilled in the art without departing from the spirit and purview of the invention.

What is claimed is:

1. A process for preparing unsymmetrical dithiophosphonic acid diesters having the general formula:

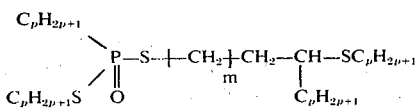

comprising the steps of reacting a compound of the formula:

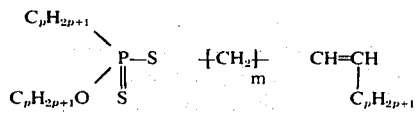

with a thiol of the general formula:

$$C_pH_{2p+2}SH$$

wherein $m$ is 0 to 1, $p$ is 1 to 4, in the presence of a free radical catalyst with both a dealkylating agent and an alkylating agent said dealkylating agent being selected from the group consisting of $(R^{XXIX})_3G$; $R^{XXX}SM$ and XM wherein $R^{XXIX}$ and $R^{XXX}$ are $C_1$ to $C_4$ alkyls, G is a nitrogen or phosphorus base, M is alkali, alkaline earth metal tetraalkyl ammonium or tetraalkyl phosphonium, X is chlorine, bromine or iodine and said alkylating agent selected from the group consisting of methyl bromide, ethyl chloride, n-propyl bromide, isopropyl iodide, hexadecyl chloride, methyl tosylate, trimethyl phosphite, trimethyl phosphate and tripropyl phosphite wherein the sequence of adding the thiol and the dealkylating-alkylating agent can be reversed.

2. A process for preparing unsymmetrical dithiophosphonic acid esters according to claim 1 wherein said diester has the general formula:

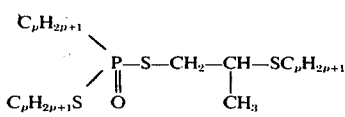

from a compound of the formula:

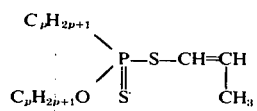

wherein $p$ of the above formulas is 1 to 4.

3. A process for preparing S-propyl-S-(2-methylthio)propyl ethanedithiophosphonate, comprising reacting O-ethyl S-1-propenyl ethanedithiophosphonate of the formula:

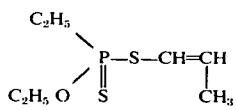

with methanethiol in the presence of a free radical catalyst and both a dealkylating agent and an alkylating agent said dealkylating agent being selected from the group consisting of $(R^{XXIX})_3G$; $R^{XXX}SM$ and XM wherein $R^{XXIX}$ and $R^{XXX}$ are $C_1$ to $C_4$ alkyls, G is a nitrogen or phosphorus base, M is alkali, alkaline earth metal tetraalkyl ammonium or tetraalkyl phosphonium, X is chlorine, bromine or iodine and said alkylating agent being selected from the group consisting of methyl bromide, ethyl chloride, n-propyl bromide, isopropyl iodide, hexadecyl chloride, methyl tosylate, trimethyl phosphite, trimethyl phosphate and tripropyl phosphite wherein the sequence of the methanethiol addition and the dealkylating-alkylating agent can be reversed.

4. A process for preparing S-propyl-S-(2-methylthio)propyl ethanedithiophosphonate according to claim 3, comprising reacting O-ethyl S-1-propenyl ethanedithiophosphonate of the formula:

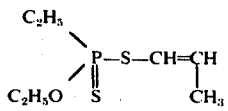

with methanethiol in the presence of a free radical catalyst, and reacting the resulting O-ethyl S-2-methylthiopropyl ethanedithiophosphonate of the formula:

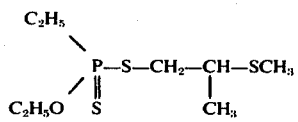

with a dealkylating agent and an alkylating agent said dealkylating agent being selected from the group consisting of $(R^{xxix})_3G$; $R^{xxx}SM$ and $XM$ wherein $R^{xxix}$ and $R^{xxx}$ are $C_1$ to $C_4$ alkyls, G is a nitrogen or phosphorus base, M is alkali, alkaline earth metal tetraalkyl ammonium or tetraalkyl phosphonium, X is chlorine, bromine or iodine and said alkylating agent being selected from the group consisting of methyl bromide, ethyl chloride, n-propyl bromide, isopropyl iodide, hexadecyl chloride, methyl tosylate, trimethyl phosphite, trimethyl phosphate and tripropyl phosphite.

5. A process for preparing S-propyl-S-(2-methylthio)propyl ethanedithiophosphonate comprising reacting O-ethyl S-1-propenyl ethanedithiophosphonate of the formula:

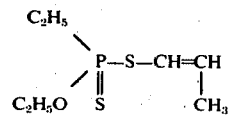

with a dealkylating agent and an alkylating agent said dealkylating agent being selected from the group consisting of $(R^{xxix})_3G$; $R^{xxx}SM$ and $XM$ wherein $R^{xxix}$ and $R^{xxx}$ are $C_1$ to $C_4$ alkyls, G is a nitrogen or phosphorus base, M is alkali, alkaline earth metal tetraalkyl ammonium or tetraalkyl phosphonium, X is chlorine, bromine or iodine and said alkylating agent being selected from the group consisting of alkyl halide, alkyl sulfonate, dialkyl sulfate, alkyl phosphate and trialkyl phosphite to produce as an intermediate S-propenyl S-propyl ethanedithiophosphonate of the formula:

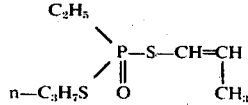

and reacting said intermediate with methanethiol under free radical conditions.

* * * * *